United States Patent
Howell

(10) Patent No.: US 12,179,729 B2
(45) Date of Patent: Dec. 31, 2024

(54) AIRCRAFT BRAKING SYSTEM

(71) Applicant: AIRBUS OPERATIONS LIMITED, Bristol (GB)

(72) Inventor: George Howell, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 249 days.

(21) Appl. No.: 17/764,841

(22) PCT Filed: Sep. 25, 2020

(86) PCT No.: PCT/EP2020/076924
§ 371 (c)(1),
(2) Date: Mar. 29, 2022

(87) PCT Pub. No.: WO2021/063833
PCT Pub. Date: Apr. 8, 2021

(65) Prior Publication Data
US 2022/0324423 A1    Oct. 13, 2022

(30) Foreign Application Priority Data

Sep. 30, 2019 (GB) ..................................... 1914073

(51) Int. Cl.
*B60T 8/17* (2006.01)
*B64C 25/42* (2006.01)
*B64F 5/60* (2017.01)

(52) U.S. Cl.
CPC .......... *B60T 8/1703* (2013.01); *B64C 25/426* (2013.01); *B64F 5/60* (2017.01)

(58) Field of Classification Search
CPC ......... B60T 8/1703; B64F 5/60; B64C 25/426
See application file for complete search history.

(56) References Cited

U.S. PATENT DOCUMENTS 6,398,162 B1    6/2002  Stimson et al.
2007/0252036 A1*  11/2007  Steiner .................. B60T 8/1703
                                                                244/111

(Continued)

FOREIGN PATENT DOCUMENTS

CN    105270610 A    1/2016
CN    105934379 A    9/2016

(Continued)

OTHER PUBLICATIONS

International Search Report and Written Opinion of the ISA for PCT/EP2020/076924, mailed Dec. 10, 2020, 11 pages.

(Continued)

*Primary Examiner* — Anshul Sood
*Assistant Examiner* — Oliver Tan
(74) *Attorney, Agent, or Firm* — Nixon & Vanderhye P.C.

(57) ABSTRACT

An aircraft controller 5, aircraft braking system 13 and method for determining braking parameters. The aircraft controller 5 is configured to determine information associated with an aircraft taxiing route associated with an aircraft 1. On the basis of the information, the aircraft controller 5 determines a first braking parameter for a first main landing gear 8 of the aircraft 1 and a second braking parameter for a second main landing gear 9 of the aircraft 1 during a landing event. The first and second braking parameters are determined to result in asymmetrical braking between the first 8 and second 9 main landing gears during the landing event.

24 Claims, 5 Drawing Sheets

(56) References Cited

U.S. PATENT DOCUMENTS

| | | | |
|---|---|---|---|
| 2007/0271019 A1* | 11/2007 | Dellac | B64C 25/426 701/3 |
| 2010/0286881 A1 | 11/2010 | Cahill | |
| 2011/0004376 A1* | 1/2011 | Chatrenet | B64D 31/06 701/41 |
| 2011/0160975 A1 | 6/2011 | Mudry et al. | |
| 2014/0209739 A1* | 7/2014 | Mayolle | B64C 25/48 244/111 |
| 2015/0286215 A1* | 10/2015 | Alvarado, Jr. | B64C 25/426 701/3 |
| 2016/0016661 A1* | 1/2016 | Howell | B60T 8/00 701/3 |
| 2017/0008503 A1* | 1/2017 | Romana | B60T 8/325 |
| 2017/0011568 A1 | 1/2017 | Romana et al. | |
| 2017/0083206 A1 | 3/2017 | He et al. | |
| 2018/0079402 A1* | 3/2018 | Brüggemann | B64C 25/426 |
| 2019/0263373 A1 | 8/2019 | Jimenez et al. | |
| 2021/0001823 A1* | 1/2021 | Georgin | B60T 8/1703 |

FOREIGN PATENT DOCUMENTS

| | | |
|---|---|---|
| CN | 106335633 A | 1/2017 |
| CN | 108382384 A | 8/2018 |
| CN | 109094772 A | 12/2018 |
| CN | 110194262 A | 9/2019 |
| EP | 0 443 213 | 8/1991 |
| EP | 1 834 875 | 9/2007 |
| GB | 2470098 | 11/2010 |
| GB | 2554097 | 3/2018 |
| WO | 96/08396 | 3/1996 |

OTHER PUBLICATIONS

Chinese Office Action cited in Application No. 202080067900.1 mailed Jun. 18, 2024, 22 pages.

\* cited by examiner

AIRCRAFT BRAKING SYSTEM

This application is the U.S. national phase of International Application No. PCT/EP2020/076924, filed Sep. 25, 2020, which designated the U.S. and claims priority to United Kingdom patent application GB 1914073.0, filed Sep. 30, 2019, the entire contents of each of which are hereby incorporated by reference.

TECHNICAL FIELD

The present invention relates to an aircraft controller, an aircraft braking system and method of operating an aircraft controller to determine braking parameters.

BACKGROUND

Before an aircraft takes off, or after an aircraft lands, it will have to follow a taxiing route that extends between the landing site (e.g. a runway) and a location where passengers or cargo are to be loaded or unloaded (e.g. a terminal building). It has been noted that, on conventional taxiing routes, a sum of left-hand turns usually differs from a sum of right-hand turns. Indeed, typically, the number of left-hand turns is greater. When turning an aircraft during taxiing, braking will generally be applied to the main landing gear at the inside of the turn, to help cause the aircraft to turn. However, this braking during taxiing causes wear and heating of the landing gear brakes. Moreover, the tendency to turn left will cause more wear and heating in the left-hand landing gear's brakes than the right-hand landing gear's brakes.

One of the factors affecting an aircraft's turnaround time after landing is the temperature of the landing gear brakes. In order for an aircraft to be permitted to take off again, the landing gear brakes must have first cooled to less than a predetermined temperature. There are desires to reduce a frequency with which brakes need to be serviced or replaced and to reduce aircraft turnaround times, so that aircraft can be operable in flight for a greater proportion of their lives.

SUMMARY

A first aspect of the present invention provides an aircraft controller configured to: determine information associated with an aircraft taxiing route associated with an aircraft; and on the basis of the information, determine a first braking parameter for a first main landing gear of the aircraft and a second braking parameter for a second main landing gear of the aircraft during a landing event, the first and second braking parameters being determined to result in asymmetrical braking between the first and second main landing gears during the landing event.

Optionally, the aircraft control is further configured to determine a difference between a sum of right-hand braking and a sum of left-hand braking in the taxiing route based on the information.

Optionally, the first and second braking parameters are determined based on the difference.

Optionally, the first braking parameter and the second braking parameter are determined such that wear on at least one brake of the first main landing gear differs from wear on at least one brake of the second main landing gear by less than a predetermined amount during a combination of the landing event and movement of the aircraft along the taxiing route.

Optionally, each of the first and second braking parameters comprises at least one of a hydraulic pressure, a braking torque, an angular deceleration of a landing gear wheel and braking authority.

Optionally, the taxiing route is a route along which the aircraft is due to taxi after the landing event.

Optionally, the first braking parameter and the second braking parameter are determined such that the temperature of at least one brake of the first main landing gear differs from the temperature of at least one brake of the second main landing gear by less than a predetermined amount at the end of the aircraft taxiing route.

A second aspect of the present invention provides an aircraft braking system for an aircraft, the aircraft braking system comprising: a first main landing gear and a second main landing gear that is to be offset laterally from the first main landing gear on the aircraft; and an aircraft controller configured to determine a first braking parameter for the first main landing gear and a second braking parameter for the second main landing gear during a landing event of the aircraft, wherein the aircraft controller is configured to determine the first and second braking parameters based on information indicative of an aircraft taxiing route associated with the aircraft, the first and second braking parameters being determined to result in asymmetrical braking between the first and second main landing gears during the landing event.

Optionally, the information comprises historical information associated with aircraft movements.

Optionally, the historical data comprises historical data associated with the aircraft taxiing route.

Optionally, the aircraft braking system further comprises an input device that is operable by an operator to override the aircraft controller by determining an alternative first braking parameter for the first main landing gear and/or an alternative second braking parameter for the second main landing gear during the landing event.

Optionally, the aircraft controller of the aircraft braking system comprises the aircraft controller of the first aspect of the present invention. The aircraft controller of the aircraft braking system may have any of the features described above as optional for the aircraft controller of the first aspect of the present invention.

A third aspect of the present invention provides a method of operating an aircraft controller to determine braking parameters for braking at least one wheel of each of a first main landing gear and a second main landing gear that are laterally offset from each other on an aircraft, the method comprising: determining information indicative of an aircraft taxiing route associated with the aircraft; and determining respective braking parameters for each of the first and second main landing gears during a landing event of the aircraft on the basis of the information, the braking parameters being determined to result in asymmetrical braking by the first and second main landing gears during the landing event.

Optionally, the determining the information indicative of the taxiing route comprises receiving the information from an input device operable by an operator.

Optionally, the method further comprises providing an indication associated with the braking parameters to an operator.

Optionally, the method further comprises receiving confirmation from an operator that the determined braking parameters are to be utilised during the landing event.

Optionally, the determining the braking parameters comprises determining the braking parameters such that braking of the first main landing gear differs from braking of the second main landing gear by an amount selected on the basis of a difference between a sum of right-hand braking and a sum of left-hand braking in the taxiing route.

Optionally, the determining the braking parameters comprises determining the braking parameters such that wear of at least one brake of the first main landing gear differs from wear of at least one brake of the second main landing gear by less than a predetermined amount during a combination of the landing event and movement of the aircraft along the taxiing route.

Optionally, the determining the braking parameters comprises determining the braking parameters such that a temperature of at least one brake of the first main landing gear differs from a temperature of at least one brake of the second main landing gear by less than a predetermined amount at the end of the aircraft taxiing route subsequent to the landing event.

Optionally, the braking parameters are for automatic application at a predetermined time during the landing event.

Optionally, the braking parameters comprise braking authorities to be provided to an operator for actuation of brakes of the first and second landing gears, respectively.

A fourth aspect of the present invention provides a non-transitory computer-readable storage medium storing instructions that, if executed by an aircraft controller, cause the controller to carry out the method described herein.

A fifth aspect of the present invention provides an aircraft controller configured to: determine a difference between a sum of right-hand braking and a sum of left-hand braking in an aircraft taxiing route associated with an aircraft; and on the basis of the difference, determine a first braking parameter for a first main landing gear of the aircraft and a second braking parameter for a second main landing gear of the aircraft, the first and second braking parameters to be used during a landing event.

A sixth aspect of the present invention provides an aircraft comprising an aircraft controller according to the first aspect of the invention, or an aircraft braking system according to the second aspect of the invention, or a non-transitory computer-readable storage medium according to the fourth aspect of the invention.

BRIEF DESCRIPTION OF THE DRAWINGS

Embodiments of the invention will now be described, by way of example only, with reference to the accompanying drawings, in which.

DETAILED DESCRIPTION

Figure 1:
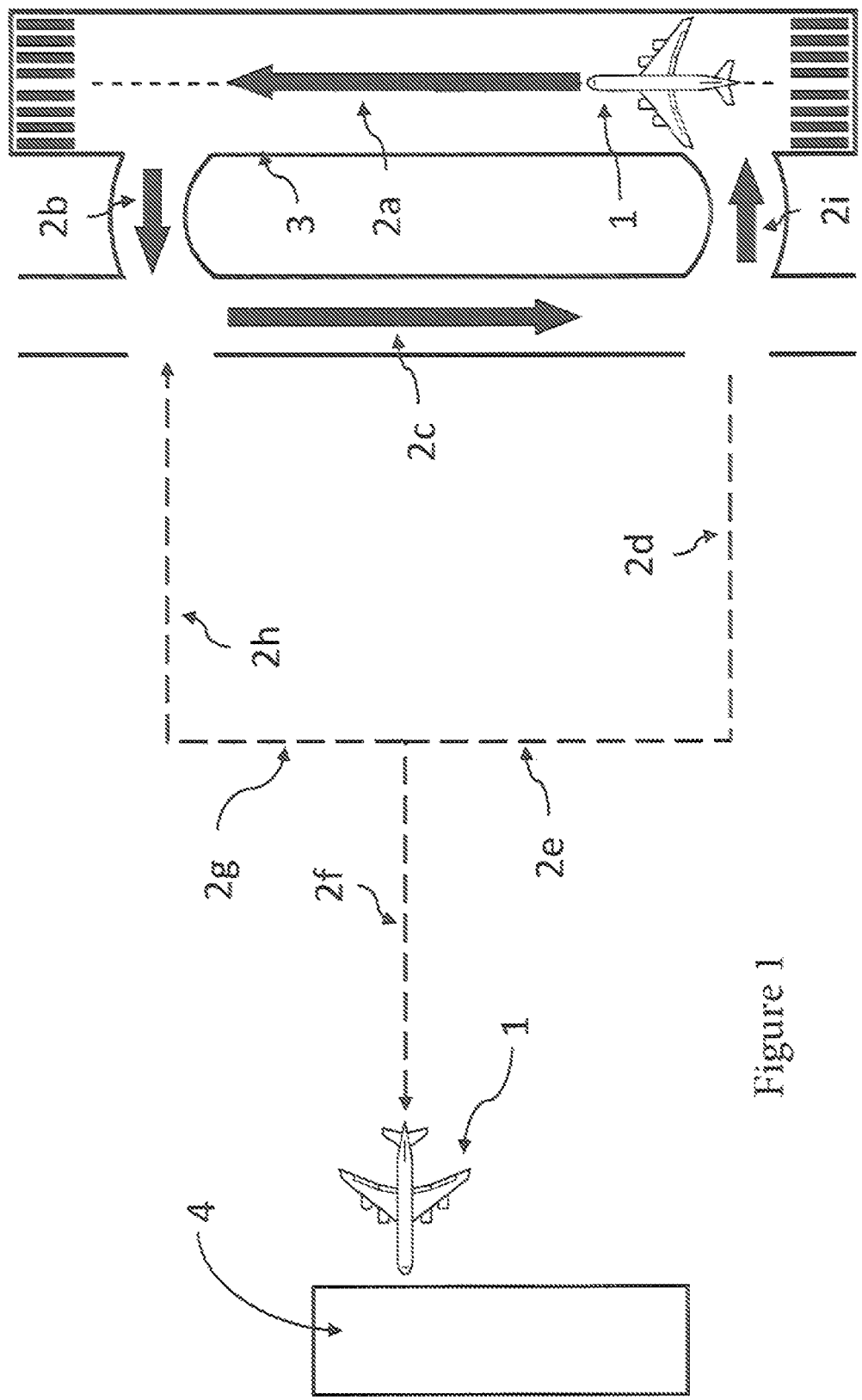
FIG. 1 shows examples of taxiing routes of an aircraft.

FIG. 1 shows example taxiing routes that an aircraft 1 may take between a landing site, such as a runway, 3 and a source or destination, such as a terminal building, 4. The taxiing route comprises the route taken by an aircraft 1 after the completion of the landing event (e.g. after the aircraft has made contact with the ground and has slowed down sufficiently to be said to have landed). As shown in FIG. 1, taxiing routes may be made up of a specific number of segments punctuated by turns (either left- or right-handed). For example, one such taxiing route from a runway 3 to a terminal 4 may comprise segments 2a, 2b, 2c, 2d, 2e and 2f. As can be seen from FIG. 1, such a taxiing route would comprise three 90-degree left-hand turns and two 90-degree right-hand turns. The difference between the respective sums of left-hand and right-hand turns is thus 90 degrees (to the left). One alternate taxiing route from the terminal 4 to the runway 3 may comprise segments 2f, 2g, 2h, 2c and 2i. Again, as seen in FIG. 1, this route would require more left-hand turns (three, each at 90 degrees) than right-hand turns (two, each at 90 degrees) for the aircraft to become aligned with the runway, and thus again a difference between respective sums of left-hand and right-hand turns of 90 degrees (to the left).

This may mean that, over the course of taxiing along each of the above-described routes, more braking would be applied to the landing gear on the left-hand side of the aircraft 1 (left-handing braking) than the right-hand side of the aircraft 1 (right-hand braking). In turn, as noted above, this can result in more wear and heating in the left-hand landing gear's brakes than the right-hand landing gear's brakes. The left-hand landing gear's brakes would thus take longer to cool down, and would wear out more quickly, than the right-hand landing gear's brakes.

Although arrows are shown on the segments, these are only illustrative of one example taxiing route. The aircraft could travel along these segments in either direction. Moreover, although solely 90-degree turns are shown in FIG. 1, this is purely for simplicity. In reality, some or all of the turns may be other than 90-degree turns.

Figure 2:
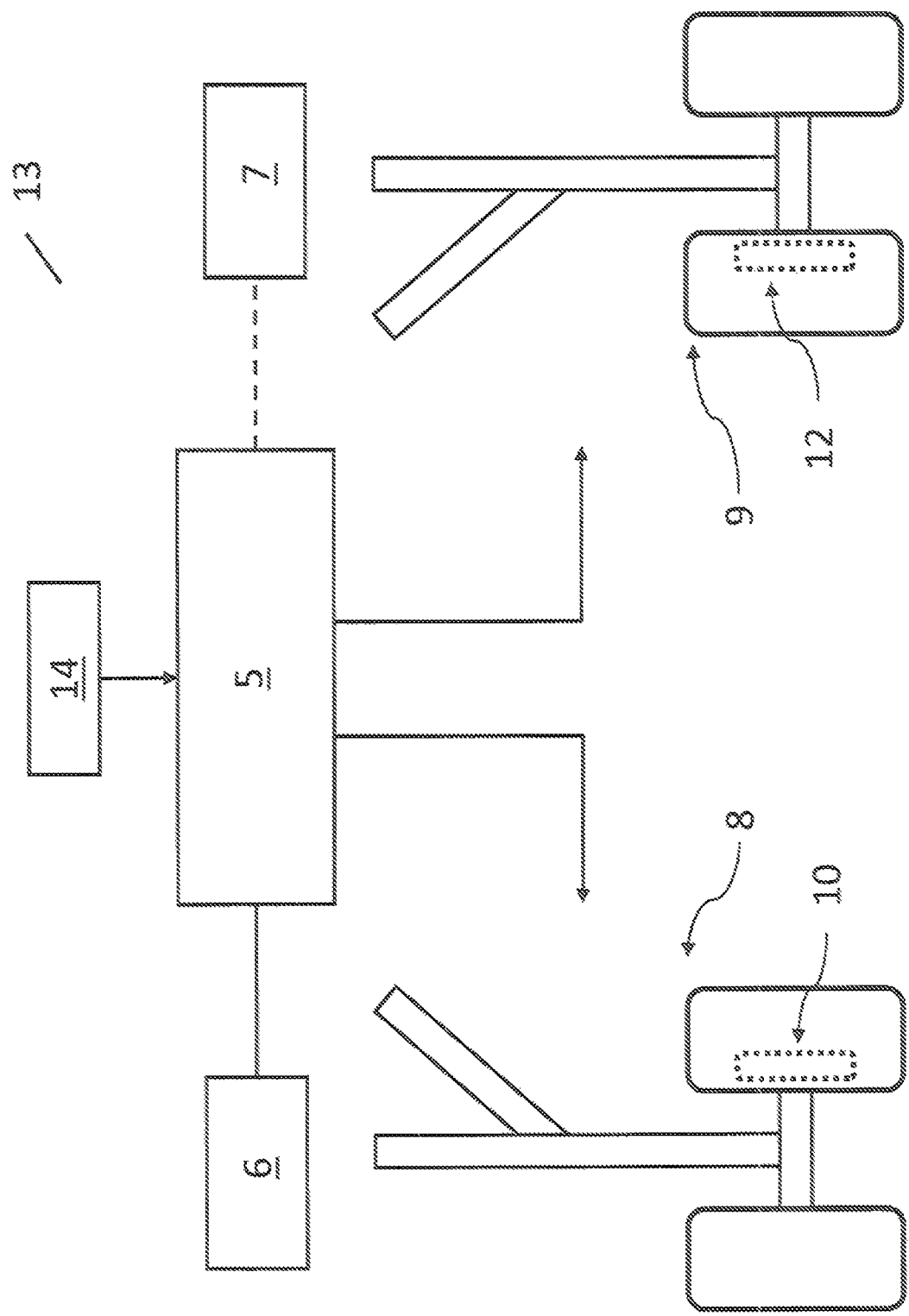
FIG. 2 shows a schematic view of an example aircraft braking system of one embodiment of the invention.

FIG. 2 shows an aircraft braking system 13 of the aircraft 1, according to one embodiment. The aircraft braking system 13 comprises a first main landing gear 8 and second main landing gear 9 that is offset laterally from the first main landing gear 8 on the aircraft 1. For example, the first main landing gear 8 may be provided on the left-hand side of the aircraft 1 and the second main landing gear 9 may be provided on the right-hand side of the aircraft 1. The aircraft braking system 13 also comprises an aircraft controller 5. The aircraft controller 5 is configured to determine a first braking parameter for the first main landing gear 8 and a second braking parameter for the second main landing gear 9 during a landing event, such as a landing event at the runway 3.

The aircraft controller 5 is configured to determine the first and second braking parameters based on information indicative of an aircraft taxiing route associated with the aircraft, in such a way that the first and second braking parameters result in asymmetrical braking between the first 8 and second 9 main landing gears during the landing event of the aircraft. In some embodiments, the aircraft controller 5 is configured to determine the information associated with the taxiing route of the aircraft 1 (for example, one of the taxiing routes discussed above with reference to FIG. 1).

In some embodiments, the information indicative of an aircraft taxiing route may comprise one or more of: one or more machine-readable airport maps, current coordinates (such as Global Positioning System (GPS) coordinates) and heading of the aircraft 1, coordinates (such as GPS coordinates) of the destination, instructions describing the route, and/or information from ground based indicators (e.g. signs and/or lights).

In some embodiments, the first main landing gear 8 and the second main landing gear 9 are arranged either side of a longitudinal axis of a fuselage of the aircraft 1. For example, the first main landing gear 8 may be disposed under a left wing of the aircraft 1 and the second main landing gear 9 may be disposed under a right wing of the aircraft 1. In this example, braking the first main landing gear 8 would cause the aircraft 1 to turn left and braking the second main landing gear 9 would cause the aircraft 1 to turn right.

In some embodiments, the aircraft controller 5 is configured to determine a difference between a sum of right-hand braking and a sum of left-hand braking in the taxiing route. The first and second braking parameters may then be determined based on this difference. For example, the aircraft controller 5 may determine that there are three left-hand turns and two right-hand turns in the taxiing route and determine that there is more left-hand braking than right-hand braking. The braking parameters may be determined on this difference. In some embodiments, the aircraft controller 5 may determine the braking parameters on the basis of the length and/or angle of the turns and/or on the basis of aircraft speed during navigation of the turns. For example, depending on the angle of turn, a relatively short turn may require a smaller amount of braking than a relatively long turn.

In some embodiments, the first and second braking parameters are determined such that wear of at least one brake 10 of the first main landing gear 8 differs from wear of at least one brake 12 of the second main landing gear 9 by less than a predetermined amount during a combination of the landing event and movement of the aircraft along the taxiing route. In some embodiments, the predetermined amount is between about 1% and 20% or between about 2% and 10% or between about 3% and 5%. Attempting to equalise wear of the brakes 10, 12 in this way helps to avoid one of the brakes being used more than the other, and thus wearing out more quickly than the other, which would otherwise necessitate a relatively early brake inspection or replacement. Moreover, it may also reduce the maximum temperature reached by either of the brakes 10, 12, so that brake-cooling times, and thus aircraft turnaround times, can be reduced.

In some embodiments, the first and second braking parameters are determined such that a temperature of at least one brake 10 of the first main landing gear 8 differs from a temperature of at least one brake 12 of the second main landing gear 9 by less than a predetermined amount at the end of the aircraft taxiing route subsequent to the landing event. In some embodiments, the predetermined amount is between about 1% and 20% or between about 2% and 10% or between about 3% and 5%. Attempting to equalise the temperatures of the brakes 10, 12 in this way may reduce the maximum temperature reached by either of the brakes 10, 12, so that brake-cooling times, and thus aircraft turnaround times, can be reduced.

In some embodiments, each of the braking parameters may define at least one of: a hydraulic pressure, a braking torque, an angular deceleration of a landing gear wheel or braking authority. Moreover, each of the braking parameters may comprise a combination of a hydraulic pressure, a braking torque and/or an angular deceleration.

In some embodiments, as previously discussed in relation to FIG. 1, the taxiing route may be a route along which the aircraft 1 is due to taxi after a landing event. Alternatively or additionally, the taxiing route may be a route along which the aircraft 1 is due to travel before taking off. In some embodiments, the taxiing route may be at the same airport where the landing event is to occur or has occurred. In some embodiments, the taxiing route is at a different airport to that at which the landing event is to occur. For example, the taxiing route may comprise a route along which the aircraft 1 travels before taking off at a first airport, whereas the landing event takes place at another, destination airport after the take-off. In some embodiments, the taxiing route may comprise a route along which the aircraft 1 is due to travel before taking off at a first location/airport together with a route along which the aircraft 1 is due to travel after a landing event at a second location/airport.

In some embodiments, the information associated with an aircraft taxing route comprises historical data associated with aircraft movements. For example, the historical data may be historical data stored on a local database 6 that forms part of the aircraft braking system 13 and/or the historical data may be stored on a database 7 that is remote from the aircraft braking system 13, such as remote from the aircraft 1. In some embodiments, the historical data may be entered into the controller 5 or the database 6, 7 by an operator, such as a member of a flight crew, or a technician. In some embodiments, the historical data may be transmitted to the local database 6 by a ground-based system. For example, the historical data may be transmitted from the ground to an aircraft 1 upon approach to landing and/or before take-off at an airport.

In some embodiments, the historical data comprises historical data associated with the aircraft taxiing route. Additionally or alternatively, the historical data may comprise historical data about one or more taxiing routes at one or more specific locations/airports, conditions/properties of one or more runways and/or weather conditions. For example, the historical data may be indicative of the most likely taxiing route at an airport. This historical data may allow the aircraft controller 5 to predict a taxiing route before the exact taxiing route is known.

In some embodiments, the aircraft braking system 13 may comprise an input device 14 that is operable by an operator, such as a member of a flight crew, to override the aircraft controller 5. For example, the operator may override the aircraft controller 5 in the event of an emergency landing where maximum braking may be required. The input device 14 may allow the operator to enter an alternative first braking parameter for the first main landing gear 8 and/or an alternative second braking parameter for the second main landing gear 9 during a landing event. Advantageously, this leaves the final decision of the braking parameters with the operator.

In some embodiments, the aircraft braking system 13 may include any aircraft controller 5 described herein.

Figure 3:
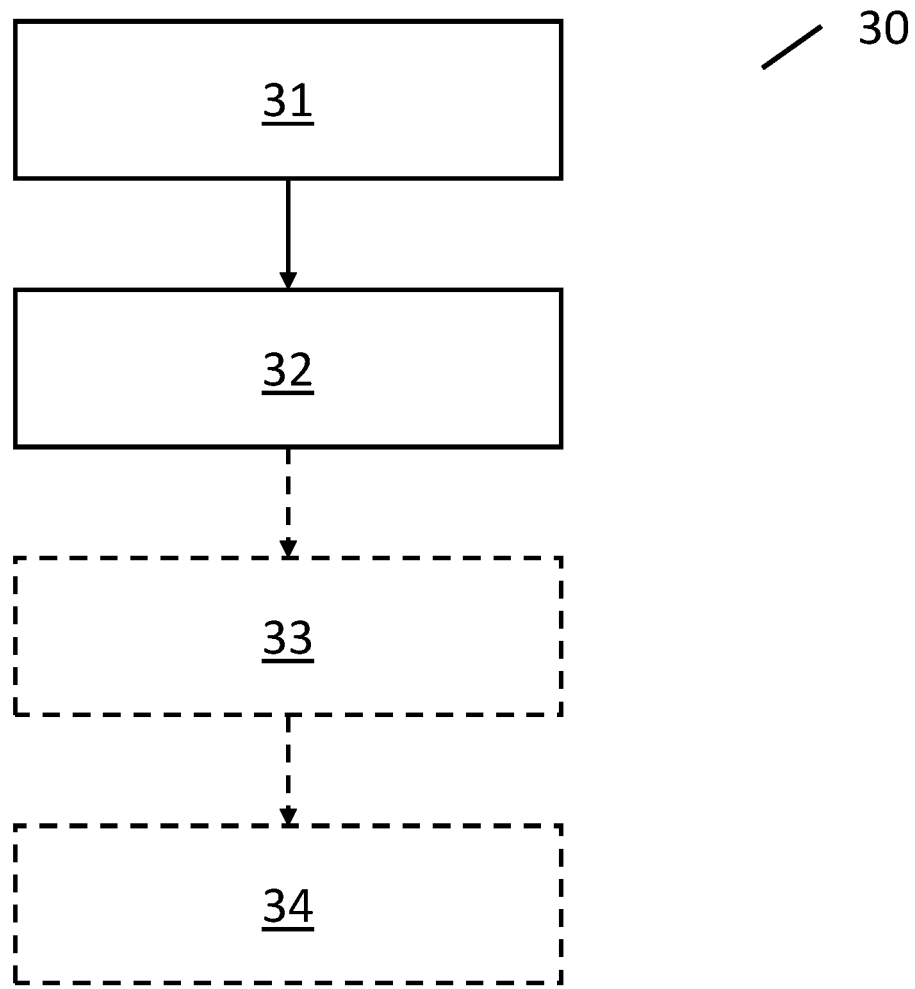
FIG. 3 shows a flow diagram of an example method of operating an aircraft controller to determine braking parameters, according to one embodiment of the invention.

FIG. 3 shows a method 30 of operating an aircraft controller to determine braking parameters for braking at least one wheel of each of a first main landing gear 8 and a second main landing gear 9 that are laterally offset from each other on an aircraft. The aircraft controller may, for example, be any of those discussed herein.

The method 30 comprises: determining 31 information indicative of an aircraft taxiing route associated with the aircraft 1; and determining 32 respective braking parameters for each of the first 8 and second 9 main landing gears during a landing event of the aircraft 1 on the basis of the information. The braking parameters are determined to result in asymmetrical braking by the first 8 and second 9 main landings gears during the landing event.

In some embodiments, the information indicative of the taxiing route may be received from an input device 14 operable by an operator, such as a member of a flight crew. For example, once the operator knows where the aircraft 1 is due to taxi to after the landing event (e.g. a gate number), they may determine the taxiing route and enter this into the input device. Alternatively or additionally, the operator may enter a destination (e.g. gate number) into the input device 14 and the controller may determine the taxiing route based on the destination.

In some embodiments, the method 30 may comprise providing 33 an indication associated with the braking parameters to an operator, such as a member of a flight crew. In some embodiments, the indication may include an indication of the braking parameter values and/or may include an indication that the braking parameters have been determined. For example, the braking parameters may be shown to an operator on a display in the cockpit of the aircraft 1. The indication may be a visual indication and/or an audible indication, for example.

In some embodiments, the method 30 may further comprise receiving 34 confirmation from an operator, such as a member of a flight crew, that the determined braking parameters are to be utilised during the landing event. Advantageously, this allows the operator to decide whether to use the determined braking parameters or not. For example, the operator may decide not to use the determined braking parameters in the case of an emergency.

In some embodiments, the determining 32 the braking parameters may comprise determining the braking parameters such that braking of the first main landing gear 8 differs from braking of the second main landing gear 9 by an amount selected on the basis of a difference between a sum of right-hand braking and a sum of left-hand braking in the taxiing route. Additionally or alternatively, the determining the braking parameters may comprise determining the braking parameters such that wear of at least one brake 10 of the first main landing gear 8 differs from wear of at least one brake 12 of the second main landing gear 9 by less than a predetermined amount during a combination of the landing event and movement of the aircraft 1 along the taxiing route 2. In some embodiments, the predetermined amount is between about 1% and 20% or between about 2% and 10% or between about 3% and 5%. Attempting to equalise wear of the brakes 10, 12 in this way helps to avoid one of the brakes being used more than the other, and thus wearing out more quickly than the other, which would otherwise necessitate a relatively early brake inspection or replacement. Moreover, it may also reduce the maximum temperature reached by either of the brakes 10, 12, so that brake-cooling times, and thus aircraft turnaround times, can be reduced.

In some embodiments, the determining 32 the braking parameters may comprise determining the braking parameters such that a temperature of at least one brake 10 of the first main landing gear 8 differs from a temperature of at least one brake 12 of the second main landing gear 9 by less than a predetermined amount at the end of the aircraft taxiing route subsequent to the landing event. In some embodiments, the predetermined amount is between about 1% and 20% or between about 2% and 10% or between about 3% and 5%. Attempting to equalise the temperatures of the brakes 10, 12 in this way may reduce the maximum temperature reached by either of the brakes 10, 12, so that brake-cooling times, and thus aircraft turnaround times, can be reduced.

In some embodiments, the braking parameters may be automatically applied at a predetermined time during the landing event. For example, the braking parameters may be applied after receiving an indication that the aircraft 1 is on the ground. Such an indication may be provided by sensors disposed on the landing gear or elsewhere on the aircraft, for example. Advantageously, this allows the operator, such as a member of a flight crew, to concentrate on other aspects of the landing event, without also having to manually apply the braking parameters.

In some embodiments, the controller may be configured, on the basis of an input by the operator, to determine the point at which the aircraft 1 should turn off of a runway 3. The braking parameters may be determined, at least in part, on the basis of this determination.

In some embodiments, the braking parameters comprise braking authorities to be provided to an operator. As such, when an operator applies braking to either or both of the first main landing gear 8 or the second main landing gear 9, the amount of braking provided is relative to the braking parameters.

Figure 4:
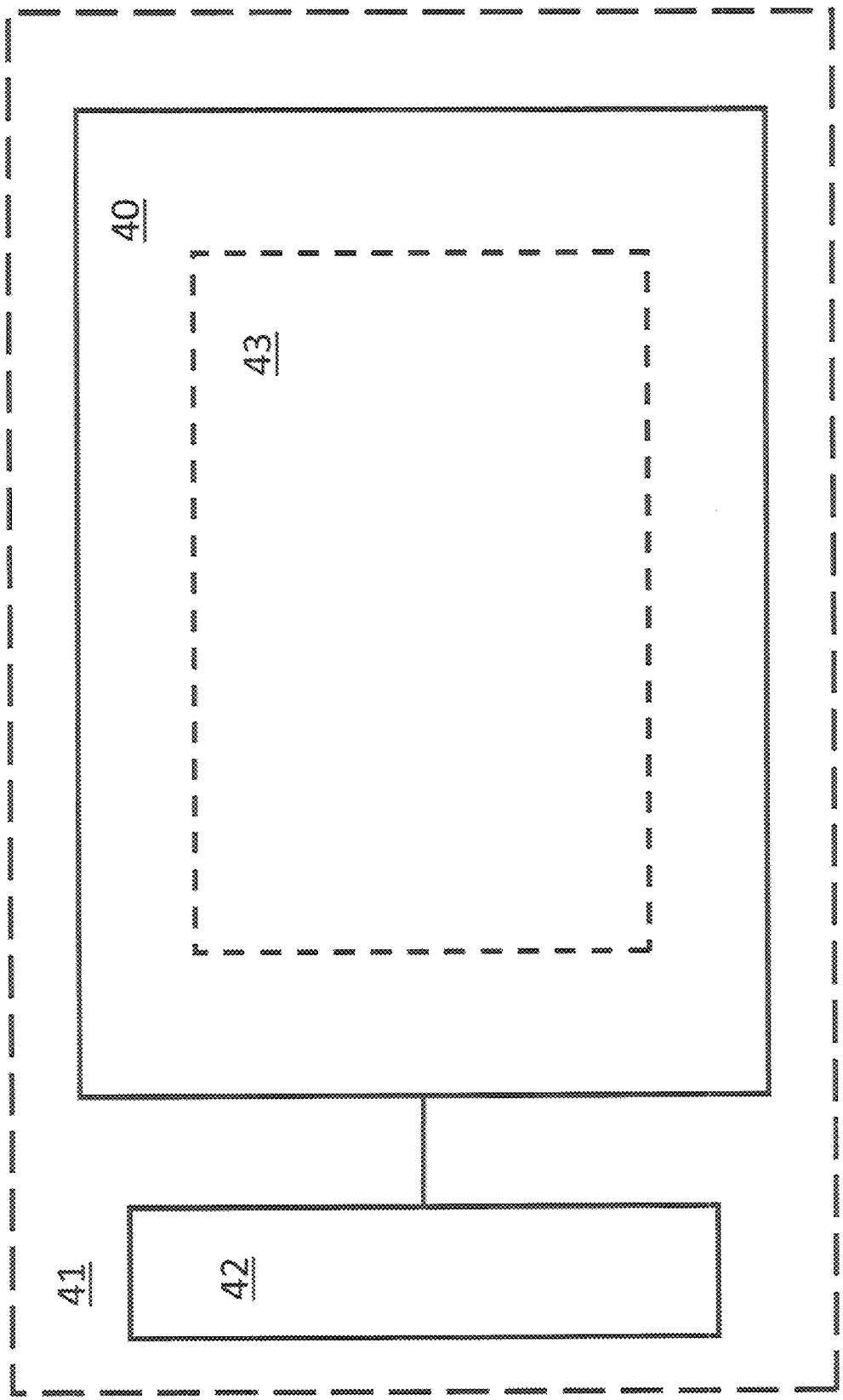
FIG. 4 shows a schematic diagram of an example of a non-transitory computer-readable storage medium of one embodiment of the invention.

FIG. 4 shows a schematic diagram of a non-transitory computer-readable storage medium 40 according to one embodiment. The non-transitory computer-readable storage medium 40 stores instructions 43 that, if executed by a processor 42 of an aircraft controller 41, cause the processor 42 to perform one of the methods described herein. In some examples, the aircraft controller 41 is the aircraft controller 5 described above with reference to FIG. 2 or a variant thereof described herein. The instructions 43 may comprise instructions to perform any of the methods 30 described above with reference to FIG. 3.

In some embodiments, an aircraft controller 5, 41 is configured to: determine a difference between a sum of right-hand braking and a sum of left-hand braking in an aircraft taxiing route associated with an aircraft 1; and on the basis of the difference, determine a first braking parameter for a first main landing gear 8 of the aircraft 1 and a second braking parameter for a second main landing gear 9 of the aircraft 1, the first and second braking parameters to be used during a landing event.

Figure 5:
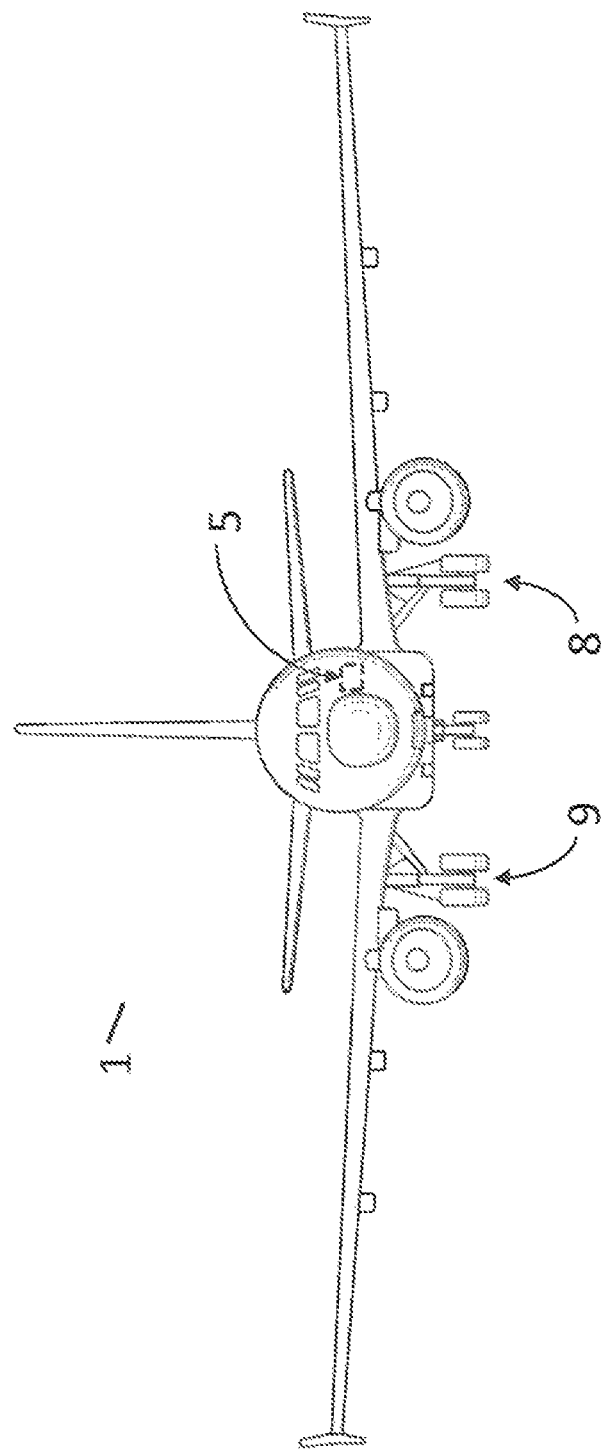
FIG. 5 shows a schematic isometric view of an example aircraft of one embodiment of the invention.

FIG. 5 shows an aircraft 1 comprising an aircraft braking system as described herein. The aircraft 1 comprises a first main landing gear 8 and a second main landing gear 9, along with an aircraft controller 5. The aircraft controller 5 may be any aircraft controller discussed above. The aircraft 1 further comprises a non-transitory computer-readable medium as described in reference to FIG. 4.

It is to be noted that the term "or" as used herein is to be interpreted to mean "and/or", unless expressly stated otherwise.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An aircraft controller configured to:
   before a landing event, determine information associated with an aircraft taxiing route associated with an aircraft and along which the aircraft is to travel after the landing event and/or traveled before a take-off event preceding the landing event;
   based on the information, determine a first braking parameter for a first main landing gear of the aircraft and a second braking parameter for a second main landing gear of the aircraft during the landing event, wherein the first braking parameter and the second braking parameter are determined to result in asymmetrical braking between the first main landing gear and the second main landing gear during the landing event; and
cause actuating of a brake of the first main landing gear using the first braking parameter during the landing event, and/or cause actuation of a brake of the second main landing gear using the second braking parameter during the landing event.

2. The aircraft controller according to claim 1, further configured to determine a difference between a sum of right-hand braking and a sum of left-hand braking in the taxiing route based on the information.

3. The aircraft controller according to claim 2, wherein the first braking parameter and the second braking parameter are determined based on the difference.

4. The aircraft controller according to claim 1, wherein the first braking parameter and the second braking parameter are determined to achieve a wear on at least one brake of the first main landing gear that differs from a wear on at least one brake of the second main landing gear by less than a predetermined amount during a combination of the landing event and movement of the aircraft along the taxiing route.

5. The aircraft controller according to claim 1, wherein each of the first braking parameter and the second braking parameter comprises at least one of a hydraulic pressure, a braking torque, an angular deceleration of a landing gear wheel and braking authority.

6. The aircraft controller according to claim 1, wherein the taxiing route is a route along which the aircraft is due to taxi after the landing event.

7. The aircraft controller according to claim 6, wherein the first braking parameter and the second braking parameter are determined to cause a temperature of at least one brake of the first main landing gear to differ from a temperature of at least one brake of the second main landing gear by less than a predetermined amount at an end of the aircraft taxiing route.

8. The aircraft controller of claim 1, wherein the determined information includes information representative of braking events during the aircraft taxiing route.

9. An aircraft braking system for an aircraft, the aircraft braking system comprising:
a first main landing gear and a second main landing gear offset laterally from the first main landing gear on the aircraft; and
an aircraft controller configured to determine a first braking parameter for the first main landing gear and a second braking parameter for the second main landing gear during a landing event of the aircraft,
wherein the aircraft controller is configured to determine, before the landing event, the first braking parameter and the second braking parameter based on information indicative of an aircraft taxiing route to be taken by the aircraft after the landing event and/or travelled before a take-off event preceding the landing event,
wherein the first braking parameter and the second braking parameter are determined to result in asymmetrical braking between the first main landing gear and the second main landing gear during the landing event, and
wherein the aircraft braking system is configured to cause actuation of a brake on the first main landing gear based on the first braking parameter during the landing event and/or cause actuation of a brake on the second main landing gear based on the second braking parameter during the landing event.

10. The aircraft braking system according to claim 9, wherein the information comprises historical data associated with movement of the aircraft.

11. The aircraft braking system according to claim 10, wherein the historical data comprises historical data associated with the aircraft taxiing route.

12. The aircraft braking system according to claim 9, further comprising:
an input device operable by an operator to override the aircraft controller by determining an alternative first braking parameter for the first main landing gear and/or an alternative second braking parameter for the second main landing gear during the landing event.

13. The aircraft braking system of claim 9, wherein the determined information includes information representative of braking events during the aircraft taxiing route.

14. A method of operating an aircraft controller to determine and apply braking parameters for braking at least one wheel of each of a first main landing gear and a second main landing gear laterally offset from each other on an aircraft, the method comprising:
before a landing event, determining information indicative of an aircraft taxiing route to be taken by the aircraft after the landing event and/or taken by the aircraft before a take-off event preceding the landing event;
determining respective braking parameters for each of the first main landing gear and the second main landing gear during the landing event of the aircraft based on the information, wherein the braking parameters are determined to result in asymmetrical braking by the first main landing gear and the second main landing gear during the landing event; and
applying the braking parameter respective to the first main landing gear to cause actuation of a brake on a wheel of the first main landing gear during the landing event and/or applying the braking parameter respective to the second main landing gear to a cause actuation of brake on a wheel of the second main landing gear during the landing event.

15. The method according to claim 14, wherein the determining the information indicative of the taxiing route comprises receiving the information from an input device operable by an operator.

16. The method according to claim 14, further comprising providing an indication associated with the braking parameters to an operator.

17. The method according to claim 14, further comprising receiving confirmation from an operator that the determined braking parameters are to be utilised during the landing event.

18. The method according to claim 14, wherein the determining the braking parameters comprises:
determining the braking parameters such that braking of the first main landing gear differs from braking of the second main landing gear by an amount selected based on a difference between a sum of right-hand braking and a sum of left-hand braking in the taxiing route.

19. The method according to claim 14, wherein the determining the braking parameters comprises:
determining the braking parameters such that wear of at least one brake of the first main landing gear differs from wear of at least one brake of the second main landing gear by less than a predetermined amount during a combination of the landing event and movement of the aircraft along the taxiing route.

20. The method according to claim 14, wherein the determining the braking parameters comprises:
    determining the braking parameters such that a temperature of at least one brake of the first main landing gear differs from a temperature of at least one brake of the second main landing gear by less than a predetermined amount at an end of the aircraft taxiing route subsequent to the landing event.

21. The method according to claim 14, wherein the braking parameters are for automatic application at a predetermined time during the landing event.

22. The method according to claim 14, wherein the braking parameters comprise braking authorities to be provided to an operator for actuation of brakes of the first and second main landing gears, respectively, during the steps of applying the first and second braking parameters.

23. The method of claim 14, wherein the determining information includes determining information representative of braking events during the aircraft taxiing route.

24. An aircraft controller configured to:

before a landing event, determine a difference between a sum of right-hand braking and a sum of left-hand braking in an aircraft taxiing route due to be taken by an aircraft after the landing event and/or taken before a take-off event preceding the landing event;

based on the difference, determine a first braking parameter for a first main landing gear of the aircraft and a second braking parameter for a second main landing gear of the aircraft, and apply the first braking parameter to cause actuation of a brake on a wheel of the first main landing gear during the landing event, and/or apply the second braking parameter to cause actuation of a brake a wheel on the second main landing gear during the landing event.

* * * * *